Sept. 22, 1970     J. J. COLEMAN     3,529,663
WASTE WATER HEAT RECLAIMER

Filed June 30, 1969     3 Sheets-Sheet 1

INVENTOR.
JAMES J. COLEMAN
BY
Bean & Bean
ATTORNEYS

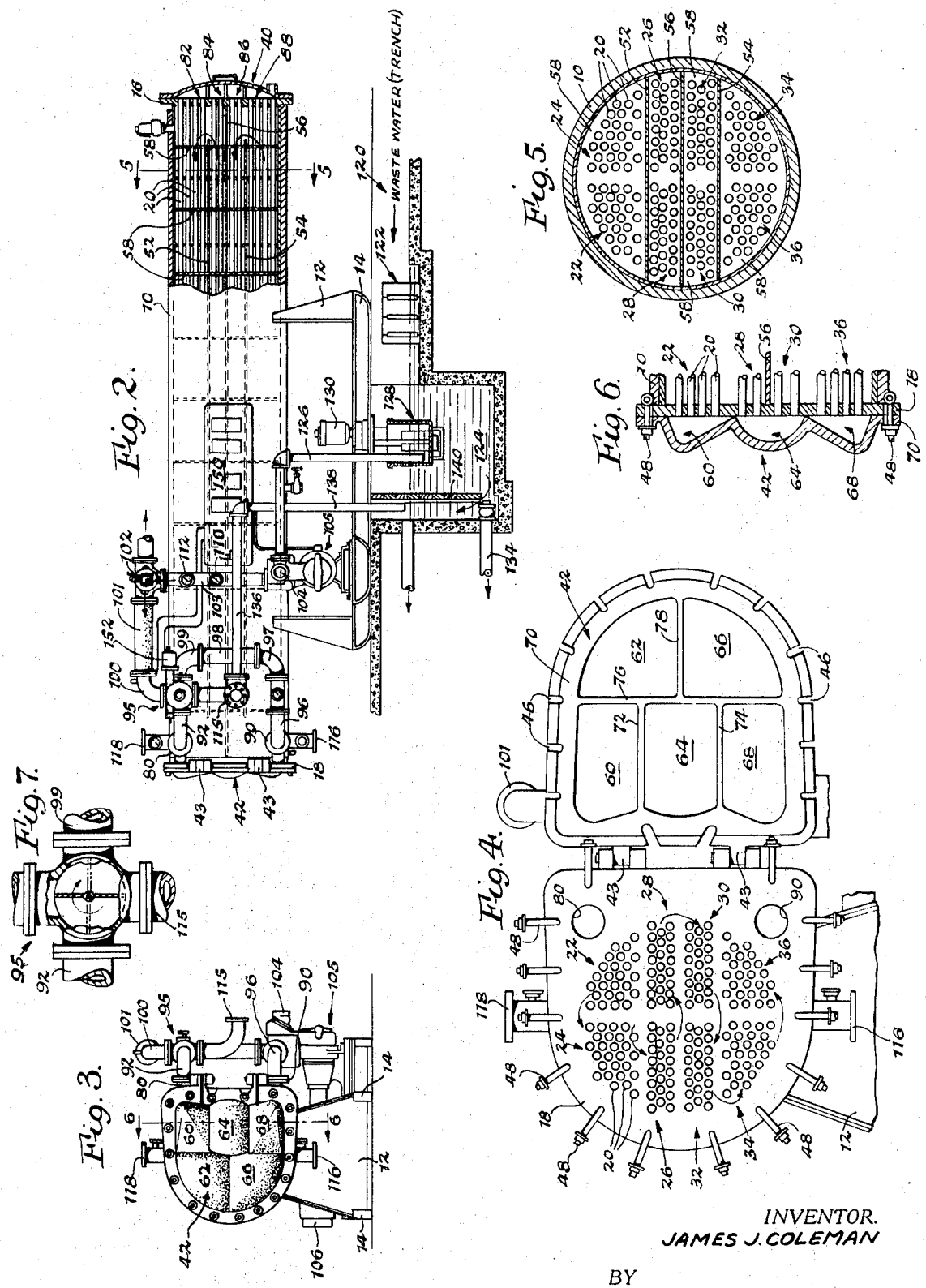

United States Patent Office 3,529,663
Patented Sept. 22, 1970

3,529,663
WASTE WATER HEAT RECLAIMER
James J. Coleman, 538 Barry St.,
Stroudsburg, Pa. 18360
Continuation-in-part of application Ser. No. 686,006, Nov. 28, 1967. This application June 30, 1969, Ser. No. 842,792
Int. Cl. F28f 9/02
U.S. Cl. 165—158    3 Claims

ABSTRACT OF THE DISCLOSURE

A heat reclaimer for recovering heat from the hot waste waters from commercial laundries, textile plants, etc., in which the waste water is conveyed through the reclaimer in such fashion as avoids the accumulation of lint, fibres or other solid materials within the passageways of the reclaimer. This is accomplished by maintaining the waste water flow velocity constant throughout the reclaimer. The ends of the reclaimer are mounted and arranged not only for simplifying the plumbing connections, but also to enable the interior to be exposed easily for cleaning.

CROSS REFERENCE TO RELATED APPLICATION

This application is a continuation-in-part of my copending application Ser. No. 686,006, filed Nov. 28, 1967.

BACKGROUND OF THE INVENTION

Waste heat reclaimers which must handle hot liquid effluents from industrial laundries or other processes in which the effluent contains solids such as lint, fibers and the like dispersed therein, are propense to clogging or partial blockage due to build-up of the solids within the heat reclaimers. As a consequence, frequent cleaning is necessary which not only entails time but also eliminates heat recovery during the cleaning process.

The cause of the above problem stems from the nature of conventional heat reclaimers using, as they do for the sake of compactness, a plurality of tube bundles housed within a shell and accommodating for serial back-and-forth flow therethrough. With such an arrangement, flow reversal must take place at the ends of adjacent pairs of tube bundles and it is usually in these areas where blockage or restriction most rapidly develops. One prior art solution to the problem involves periodic backwash flow of solid-free fluid, but this entails shutdown time during backwash, is wasteful of fluid, and does not eliminate the problem since it merely lengthens the time between which successive physical cleaning will be necessary.

Another prior art solution entails the elimination of changes in cross-sectional flow area within the tube system by providing U-shaped extensions of the individual tubes in those areas in which flow reversal is effected. Although such a system practically eliminates the presence of dead spots wherein solids may accumulate, it is a costly solution and involves considerable time for disassembly and assembly should the need for repair arise. Moreover, it is a practical impossibility to arrange and align a series of U-bends to accommodate the assembly in a compact space.

SUMMARY OF THE INVENTION

The present invention is directed to a waste heat reclaimer having straight-through tube bundles and flow reversing means in the form of cavities bridging the ends of adjacent pairs of tube bundles. The cavities are so shaped as not only assures equality of flow rate through the individual tubes of each bundle, but also maintains uniform and constant flow within the cavities, to the practical elimination of dead spots wherein accumulation of solids may take place.

The ends of adjacent pairs of tube bundles bridged by the cavities are characterized in that the individual tubes of each bundle are arranged so as to present groups aligned generally transverse to the direction of fluid flow and the cross-sectional area of each cavity is decreased on either side of a maximum flow region lying between the bundles. The decrements are progressive and reduce the cross-sectional area at various transverse stations within the cavities in each case by amounts substantially equal to the cross-sectional area of the tube group adjacent the station.

The above arrangement is also compatible with the provision of bonnets within which the cavities are formed. The header plates for the tube bundles are provided with lateral extensions to which the bonnets are hinged and one such extension provides the base for connection of the waste fluid inlet and outlet which respectively lead into two different cavities of the associated bonnet.

DRAWINGS

The invention is illustrated by way of example in the accompanying drawing, wherein:

FIG. 2 is a side elevational view, partly in section, and showing the apparatus of the invention installed in conjunction with a pit receiving the hot waste water effluent of a commercial laundry or the like;

FIG. 3 is a left hand end view of the apparatus of FIG. 2;

FIG. 4 is an enlarged scale fragmentary end view of the apparatus corresponding to FIG. 3 but showing the end cover bonnet in opened position, and the tube header in end elevational view;

FIG. 5 is an enlarged scale sectional view taken as suggested by line 5—5 of FIG. 2;

FIG. 6 is an enlarged scale fragmentary sectional view taken as suggested by line 6—6 of FIG. 3;

FIG. 7 is a fragmentary diagrammatic view of a valve component of the apparatus control system;

DETAILED DESCRIPTION

Figure 1:
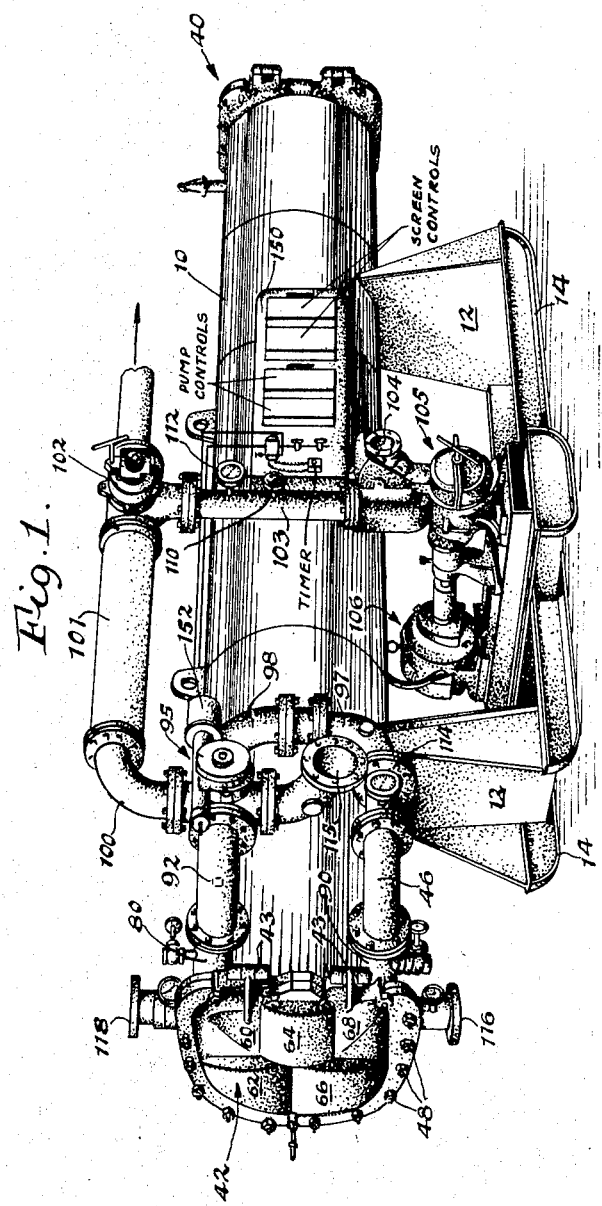
FIG. 1 is a side perspective view of an apparatus of the present invention.

As shown by way of example in the drawing herewith, the invention may be embodied in a waste water heat reclaiming apparatus comprising generally a cylindrical shell designated 10 which is disposed horizontally and mounted on pedestals 12–12 supported on parallel skid members 14–14, for convenience in sliding the apparatus into operative positions. As best shown at FIGS. 2, 4, 6, the shell 10 is closed at its opposite ends by means of tube headers 16–18 which carry the opposite ends of waste water conveying tubes 20. As best shown at FIGS. 4, 5, 6, the tubes 20 are functionally grouped in "bundles" as indicated generally at 22, 24, 26, 28, 30, 32, 34 and 36.

It is a particular feature of the present invention that the headers 16, 18 are enclosed by specially designed bonnet devices as indicated generally at 40–42. The bonnet 40 at the rear end of the shell is hinged and bolted or otherwise suitably fixed to the shell. Also the front end bonnet 42 is preferably hingedly mounted on the header plate 18 as indicated at 43, FIGS. 1, 2 and 4, so as to be swingable thereon to the open position shown at FIG. 4 for inspection access purposes. The bonnets 40 and 42 are slotted at intervals about its perimeter as indicated at 46 (FIG. 4) to accommodate lock bolts 48 which are hingedly mounted on the header plate 18 so as to be swingable in and out of the slotted portions of the bonnet for immediate release and locking the latter to the header.

Partition plates 52, 54 and 56 extend longitudinally of the interior of the shell 10; horizontally and at different elevations therein. Thus, the interior of the shell 10 is divided into four separate passageways or chambers at vertically progressive levels therein which accommodate the tube groups 22, 24, 26, 28, 30, 32, 34 and 36. Vertical baffle plates as shown at 58, FIGS. 2, 5, are preferably provided to partially extend alternatively from opposite sides of the shell into its interior, thereby providing for a horizontally zig-zag fluid passageway at the four different levels through the shell.

As best shown at FIGS. 3, 4, 6, the bonnet 42 is especially shaped to present a multi-concaved inside surface structure; the cavities of which are designated 60, 62, 64, 66 and 68 in the drawing herewith. The cavities are outlined by a marginal rim portion 70 and intermediate rib portions 72, 74, 76 and 78, all of which bear in liquid-sealing relation against the header plate 18 when the bonnet 42 is in closed position as illustrated at FIGS. 1–3, 6. Thus it will be seen that, as illustrated by the flow-direction arrows in FIG. 4, the cavity portion 60 receives inlet flow of hot waste water through an inlet port 80 and directs the inlet flow into the adjacent ends of the tubes comprising the tube group 22. The waste water then travels through the tube group 22 and exits from the rear ends thereof through the header 16 and into the concave cavity designated 82, FIG. 2, of the bonnet 40 which is structurally similar to the bonnet 42.

The cavity portion 82 of the bonnet 40 redirects the exit flow of waste water from the tube group 22 into the rear ends of the tubes of group 24, through which it then travels and exits into the upper portion of the cavity 62 of the front bonnet 42. It is herein redirected downwardly and thence into the front ends of the tubes of group 26 for passage therethrough, and then exits into the upper portion of a cavity designated 84 in the rear bonnet 40, FIG. 2, which is a counterpart of the cavity 64 in the bonnet 42. The waste water is here redirected in sidewise direction and thence into the rear ends of the tubes of group 28.

Upon exiting from the front ends of the group 28 tubes the water is redirected downwardly by the cavity 64 in the front header and into the front ends of the tubes of group 30. Upon exiting at the rear ends of the group 30 tubes it is received by a cavity portion 86 in the rear bonnet and redirected sidewise into the rear ends of the group 32 tubes. Upon exiting from the front ends thereof it is received by the upper portion of cavity 66 in the front header and redirected downwardly and into the front ends of the tube group 34. Upon exit from the rear ends thereof it is received by a cavity portion 88 of the rear bonnet and redirected sidewise into the rear ends of the group 36 tubes. Upon exiting from the front ends thereof it is received by the cavity portion 68 of the front bonnet and then directed into an outlet port 90.

As best shown at FIGS. 1–3, the inlet port 80 is coupled to a waste water feed conduit 92 leading from a two-position four-way valve 95. The outlet port 90 similarly connects through conduits 96, 97, 98, 99 to a secondary inlet port of the valve 95. The primary inlet port of the valve 95 is connected through conduits 100, 101, 102, 103 to the outlet discharge portion of a pump 105 which is driven by a motor as at 106. Port 104 is the pump suction from the Roto Screen as shown in the drawing herewith, the conduit section 101 is preferably of flexible vibration-absorbing construction; and an appropriately located pressure gauge and thermometers are arranged in conjunction with the conduit system as illustrated at 110, 112, 114, respectively to guide the operator in control of the apparatus as will be explained hereinafter. The cooled waste water outlet from the apparatus is illustrated at 115.

The fresh cold water inlet for the apparatus is illustrated at 116, and the heated fresh water outlet connection is illustrated at 118. The interior of the shell 10 is vertically and horizontally partitioned as explained hereinabove by the partition plates 52, 54, 56, so as to functionally separate and enclose the tube groups; the partition plates 52, 54, terminating short of the rear end of the shell 10 as shown at FIG. 2, and the partition plate 56 terminating short of the front end of the shell. Hence, it will be appreciated that the cold fresh water entering the inlet 116 will flow initially rearwardly around the tubes 34, 36; thence forwardly around the tubes of groups 30, 32; thence rearwardly around the tubes of groups 26, 28; and thence forwardly around the tubes of groups 22, 24 and finally out through the outlet connection 118.

Whereas FIG. 1 illustrates the apparatus of the invention in "packaged" form as furnished by the manufacturer, FIG. 2 illustrates an installation of the apparatus in conjunction with a typical commercial laundry or textile waste water handling system. As shown therein, the waste water from the laundry or the like enters the installation through a trench 120 and travels through a scalping screen unit 122 to a pit 124 accommodating the suction pipe 126 leading to the suction inlet 104 of the pump 105. As indicated at 128 the intake end of the pipe 126 is preferably enclosed within a rotating screen of the type shown in my earlier Pat. No. 2,781,916; the screening device being driven by a motor as indicated at 130. A waste water overflow from the pit 124 is indicated at 132, and a pit cleanout drain pipe is indicated at 134. The cooled waste water outlet 115 of the apparatus of the invention is shown as being connected through conduits 136, 138 for delivery of the cooled waste water into the pit 124 behind a baffle plate 140 to keep it separate from the hot waste water feed.

As illustrated at 150, an automatically operating control system for the valve 95 is provided. Whereas the pump 105 and the motor 130 driving the screen 128 are arranged to operate continuously, the valve 95 is arranged to be timer-controlled so as to be periodically reversed for short back-flushes of the tube system. This prevents any permanent logements of lint or other sediments in the waste water conveying conduit-tube-bonnet system.

For example, the control mechanism may be typically arranged to be timer-controlled so as to position the valve 95 for normal operation of the system as explained hereinabove for a period of an hour or so; the spent waste water exiting through the outlet 115 and into the left hand portion of the sump 124 and finally discharging through the conduit 132. Then, the timer mechanism on panel 150 operates a solenoid controlling an air cylinder as indicated at 152, FIG. 2, to reverse the valve 95 for a period of say two or three minutes. Reversal of the valve causes the hot waste water to be pumped from the sump 124 through the valve and the conduits 99, 98, 97, 96, and into the front bonnet through the connection 90; thence in reverse direction through the tube system and exiting through the connection 80; the valve 95; and the outlet 115 through the conduits 136, 138 to the sump overflow. This effectively back-flushes the tube and bonnet system; whereupon the time controlled mechanism 150 again operates to reverse the valve 95 for normal operation of the heat exchange system as explained hereinabove.

It is another particular feature of the present invention that the bonnet members 40, 42 are smoothly concaved at their inner surface water stream transfer portions; and that the concavities thereof are sectionally dimensioned so as to provide reverse direction flow passageways from one tube group to another such as will maintain a substantially constant velocity fluid flow throughout all parts of the tube and bonnet system. Hence, no angularly shaped pockets or other velocity change conditions exit in the fluid flow system such as would otherwise induce eddy currents and/or "dead"

spaces in the flow system such as would result in clogging thereof by accretions of solid materials carried by the waste water. The bonnets may of course be manufactured by casting or sheet metal pressing processes or the like.

Figure 9:
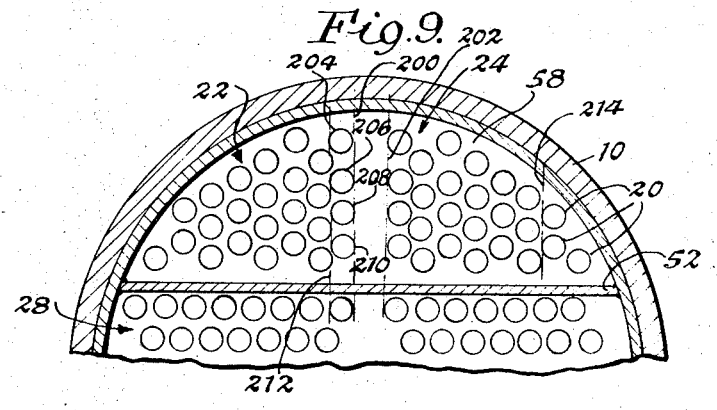
FIG. 9 is an enlarged view similar to FIG. 8 but based upon FIG. 5.

In the arrangement according to the present invention, the various tube bundles 22, 24, 26, 28, 30, 32, 34 and 36 are each of substantially the same total cross-sectional area and, as has been mentioned, an objective of the present invention is to maintain the waste fluid flow rate throughout the entire heat reclaimer system at a substantially constant velocity without the presence of any dead spot or places in which solid materials may readily accumulate. More particularly, it is of concern in connection with the present invention not only that the flow rate is subtantially constant as described, but also that each individual tube of each of the tube bundles passes substantially the same amount of fluid and at substantially the same flow velocity and that the cavities in the two bonnets 40 and 42 preserve the integrity of this arrangement. For this purpose, as may be understood from viewing FIGS. 2 and 5, the part-spherical bonnet 40 is horizontally divided by baffles 52', 54' and 56' aligned with the partition plates 52, 54 and 56 such that a diametrical cross-section extending vertically and perpendicular to the plane of the paper will provide maximum flow passageways in each of the cavities 82, 84, 86, 88 formed by the baffles which are subtantially identical to each other and which are also substantially identical to the total cross-sectional area of one tube bundle. Because of the part-spherical shape of the bonnet 40, it will be readily appreciated that the baffles 52' and 54' are disposed much more closely to the center as shown in FIG. 2 and of course the baffle 56' extends in a horizontal diametrical plane perpendicular to that described above in conjunction with the maximum flow areas. Thus, as viewed in FIG. 2, each of the cavities 82, 84, 86 and 88 is of substantially the same cross-sectional area according to the vertical medial longitudinal section illustrated and these areas are all equal substantially to the total cross-sectional area of any one tube bundle. The radius of the part-spherical surface of the bonnet 40 is so chosen that the bonnet tapers from left to right and vice versa in FIG. 9 in particular fashion to maintain like cross-sectional areas along various stations within cavities 82, 84, 86, 88 as will be described presently to retain the substantially constant flow velocity not only through the cavities but also into the various tubes of the adjacent tube bundles. Thus, as is shown in FIG. 9, the two lines 200 and 202 delineate the imaginary region between which the aforementioned diametrical plane containing the maximum cross-sectional area at the stations 200 and 202 only very slightly from this maximum, it being again appreciated that maximum is, in any case, substantially equal to the total cross-sectional area of either one of the two bundles 22 or 24. The individual tubes of the two bundles are arranged between the header plates so that they are arranged in groups aligned generally transverse to the direction of fluid flow in the pockets, as for example, the groups defined by the individual tubes 204, 206, 208 and 210 in the tube bundle 22 of FIG. 9. The radius of the part-spherical bonnet 40 is chosen such that at the imaginary station 212 in FIG. 9, the cross-sectional area of a plane passed through such station perpendicular to the page is equal to the aforementioned maximum cross-sectional flow area less the total cross-sectional area delineated by the tubes 206, 208, 210, and 212. The radius may be calculated very closely so that each such imaginary station beyond each of the transversely aligned groups of individual tubes will progressively provide decrements in the cross-sectional area according to the decrease in cross-sectional area occasioned by the tubes lying to the right of such station in the tube bundle 22 and, lying to the left of such stations in the tube bundle 24. For example, the total cross-sectional area at the imaginary station 214 in the tube bundle 24 of FIG. 9 will equal the maximum cross-sectional flow area within the region 200-202 less all of the tubes lying to the left of the station 214 in FIG. 9 or, as stated in other terms, will be substantially equal to the area of the three tubes lying to the right of the station 214. It has been found that part-spherical surface of bonnet 40 may be calculated to provide a close approximation to the ideal condition enumerated above.

Figure 8:
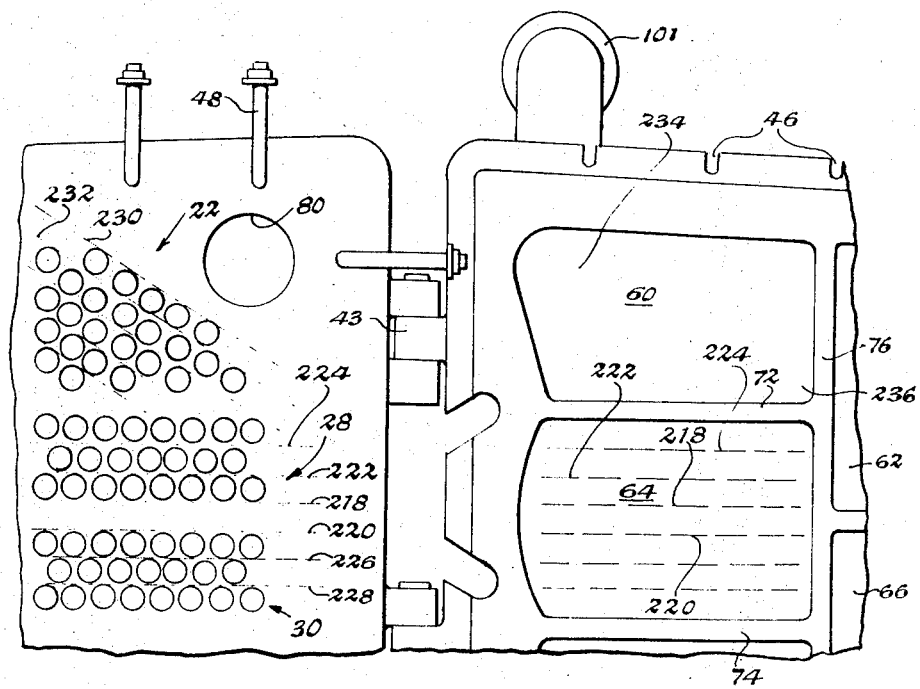
FIG. 8 is an enlarged fragmentary view of a portion of FIG. 4, illustrating the manner in which the bonnet cavities are shaped.

The situation prevailing with respect to the cross-sectional areas of the various cavities 60, 62, 64, 66 and 68 is shown in FIG. 8 as related to the bonnet assembly 42 shown in FIG. 4. Thus, for the reversal between the ends of the tube bundles 28 and 30 in FIG. 8, as occasioned by the cavity 64, the maximum cross-sectional area is disposed midway between the two stations 218 and 220 corresponding to the similarly designated dashed lines in the cavity 64 lying to the right of the tube bundle 28 in the position of the parts as shown in FIG. 8. Thus, for example, the cross-sectional area provided by the cavity 64 at the station 222 is equal to the maximum cross-sectional area less the total cross-sectional area of the group of tubes lying between the two stations 218 and 222; the cross-sectional area at the station 224 is equal to the aforementioned maximum area less the total cross-sectional areas of the two groups of tubes lying between the stations 218 and 224 or, stated in other terms, will be substantially equal to the area of the last group of tubes lying above the station 224 in FIG. 8. A similar situation prevails for the stations 226 and 228, it being appreciated then that the cavity 64 is substantially symmetrical about a horizontal center plane therethrough.

For the cavity 60, it will be appreciated that the cross-sectional area transverse to the general direction of fluid flow from the inlet opening to the tube bundle 22 will be of the aforesaid maximum cross-sectional area within the region lying between the opening and the station 230 whereas at the station 232, the cross-sectional area will be decreased by the amount of the cross-sectional area of that group of tubes lying between the station 230 and 232 and so on for the various stations delineated and depicted in FIG. 8. Thus, the cavity 60 will be so shaped as to present, with the header plate with which it is associated, a maximum flow region in the general area designated by the reference character 234 in FIG. 8 and will taper to a minimum flow area in the region depicted by the reference character 236, thus giving rise to the rather odd shape for the cavity 60 which is evident in FIG. 6. The same is true for the cavity 68 in FIG. 4 and as is shown in FIG. 6 whereas the symmetry generally provided by the cavity 64 is also shown in FIG. 6.

By maintaining the integrity of the various cross-sectional areas of the different stations as described generally above, a smooth and progressive decrement in cross-sectional area may be achieved for transverse sections with respect to the fluid flow and along the direction of fluid flow, continually tapering off the cross-sectional area from the maximum to the minimum at that tube group most remote from the maximum cross-sectional area. Of course, the reverse is true for those situations in which merely return flow of the fluid is achieved as between adjacent ends of a pair of tube bundles, that is, speaking from the direction of fluid flow, the transverse cross-sectional areas increase from the most remote group to the most immediate with respect to the total cross-sectional flow area and then the decrease from there to the most remote tube group into which the fluid flow is directed.

A further feature of the present invention resides in the fact that each of the header plates is provided with a lateral extension portion which is projected beyond the shell 10 and to which the bonnets 40 and 42 are respectively hinged. In addition to making for a neat and convenient arrangement of the bonnets whereby they may be swung outwardly for easy access thereto as well as to the various tube bundles, this arrangement taken in conjunction with the cavities 60 and 68 in FIG. 4 conveniently permits the inlet and outlet openings 80 and 90 to be so positioned as to make it easy for the requisite plumbing connections to be made as will be evident from FIG. 2, the whole assembly being of neat and convenient arrangement devoid of any substantial complexity.

What is claimed is:

1. A waste heat reclaimer for recovering heat from a flowing supply of hot liquid having solids dispersed therein, comprising in combination,
    a generally horizontal tubular shell,
    a tube header fixed to each end of said shell, each of said headers having a portion extending laterally beyond said shell,
    a plurality of tube bundles extending between and through said headers and fluid-sealed at their opposite ends to said headers,
    a bonnet hingedly secured to each header on the laterally extending portion thereof and each bonnet having a plurality of separate cavities for reversing the direction of flow from one tube bundle into an adjacent tube bundle whereby waste fluid may flow serially through said tube bundles,
    each tube bundle comprising a plurality of separate tubes arranged in groups arranged generally transverse to the direction of waste fluid flow within an associated cavity,
    means for circulating heat recovery fluid through said shell around said tube bundles,
    one of said headers having, in its laterally projecting portion, openings for connection to the inlet and outlet for the waste fluid and such openings leading directly to separate cavities of the associated bonnet, and
    each of said cavities defining with an associated header a flow passage of varying transverse cross-sectional area in the direction of waste fluid flow therein, the transverse cross-sectional area of each flow passage being maximum in the region between the tube bundles associated therewith and substantially equal thereat to the total cross-sectional area of one tube bundle, the transverse cross-sectional area of each passage progressively decreasing on either side of its said region at stations in the regions of said groups of tubes by amounts substantially equal to the flow areas of the corresponding groups of tubes.

2. In a waste heat reclaimer for recovering heat from a flowing supply of hot liquid containing solids dispersed therein, in combination,
    a tubular shell,
    a head plate closing each end of said shell,
    a plurality of tube bundles extending between and through said header plates and fluid-sealed thereto,
    means for flowing waste fluid serially through said tube bundles,
    said means comprising a bonnet hingedly secured to each said header plate and each bonnet having a plurality of cavities therein each bridging between corresponding ends of a pair of tube bundles to establish the serial flow therethrough, each tube bundle comprising a plurality of separate tubes arranged in groups aligned generally transverse to the direction of waste fluid flow within each corresponding cavity, each cavity defining with the associated header plate a flow passage of varying transverse cross-sectional area in the direction of waste fluid flow therein, the transverse cross-sectional area of each said flow passage being maximum in the region between the tube bundles and substantially equal thereat to the total cross-sectional area of one tube bundle, the transverse cross-sectional area of each said flow passage progressively decreasing on either side of said region at stations in the regions of said groups of tubes by amounts substantially equal to the flow areas of the corresponding groups of tubes, and
    means for circulating recovery fluid through said shell.

3. In the waste heat reclaimer according to claim 2 wherein one of said headers is provided with waste fluid inlet and outlet connections leading respectively into two different cavities at the extremities of the serial flow path through the heat reclaimer.

References Cited

UNITED STATES PATENTS

| 2,049,748 | 8/1936 | Rathbun | 165—161 |
| 2,651,508 | 9/1953 | Breaby | 165—12 |

CHARLES SUKALO, Primary Examiner

UNITED STATES PATENT OFFICE
CERTIFICATE OF CORRECTION

Patent No. 3,529,663　　　　　　　　　　　　　　　　September 22, 1970

James J. Coleman

It is certified that error appears in the above identified patent and that said Letters Patent are hereby corrected as shown below:

Column 4, line 41, "logements" should read -- lodgements --; line 74, "exit" should read -- exists --. Column 5, line 51, after "area" insert -- is contained and which deviate in cross-sectional area --. Column 8, line 7, "head" should read -- header --.

Signed and sealed this 23rd day of March 1971.

(SEAL)
Attest:

EDWARD M. FLETCHER, JR.　　　　　　　　　WILLIAM E. SCHUYLER, JR.
Attesting Officer　　　　　　　　　　　　Commissioner of Patents